United States Patent [19]

Fukuda et al.

[11] Patent Number: 4,998,353
[45] Date of Patent: Mar. 12, 1991

[54] RECIPROCATING TOOL

[75] Inventors: Kenji Fukuda; Yasuo Kazama, both of Tokyo, Japan

[73] Assignee: Nitto Kohki Co., Ltd., Tokyo, Japan

[21] Appl. No.: 353,547

[22] Filed: May 18, 1989

[30] Foreign Application Priority Data

May 23, 1988 [JP] Japan .................. 63-67919[U]

[51] Int. Cl.⁵ .................. B23D 49/00; B23D 49/04; B23D 49/10
[52] U.S. Cl. .................................. 30/392; 30/393; 30/394
[58] Field of Search .................. 30/392, 393, 394

[56] References Cited

U.S. PATENT DOCUMENTS

| | | | |
|---|---|---|---|
| 3,388,728 | 6/1968 | Riley, Jr. et al. | 30/392 |
| 3,750,483 | 8/1973 | Burrows et al. | 30/392 |
| 3,895,438 | 7/1975 | Burkepile et al. | 30/392 |
| 3,905,105 | 9/1975 | Tuke | 30/393 |
| 3,977,289 | 8/1976 | Tuke | 30/392 |
| 3,978,862 | 9/1976 | Morrison | 30/393 |
| 4,137,632 | 2/1979 | Pfamzer | 30/393 |
| 4,145,811 | 3/1979 | Kendzior | 30/394 |

Primary Examiner—Douglas D. Watts
Assistant Examiner—Paul M. Heyrana, Sr.
Attorney, Agent, or Firm—Nixon & Vanderhye

[57] ABSTRACT

A reciprocating tool, comprising a drive source and a tool holder for holding a grinding/cutting tool capable of reciprocation, the reciprocation drive source including a driving shaft, a driving bevel gear mounted on the driving shaft, a first shaft extending at right angles to the moving direction of the grinding/cutting tool, a driven bevel gear supported by the first shaft and in mesh with the driving bevel gear, a second shaft coaxially facing the first shaft, a third eccentrically connecting the first and second shafts, a bearing mounted on the support shaft, and a reciprocating member coupled to the tool holder, the reciprocating member having a slot extending at right angles to the moving direction of the grinding/cutting tool so as to engage the bearing.

5 Claims, 2 Drawing Sheets

RECIPROCATING TOOL

BACKGROUND OF THE INVENTION

1. Field of the Invention

The present invention relates to an improvement of a mechanism for converting rotation of a driving shaft into reciprocation, in a reciprocating tool having a saw blade, file, or grinding tip attached to the distal end portion thereof.

2. Description of the Related Art

In a conventional reciprocating tool, a grinding/cutting tool, such as a saw blade, file, or grinding tip, is attached to the distal end portion of a tool holder. The tool holder is supported at the distal end portion of a grip section of a reciprocating mechanism for reciprocation. As a driving shaft of the reciprocating mechanism rotates, the tool holder is reciprocated. The reciprocating mechanism includes a bevel gear, which serves to reduce the speed of the rotation of the driving shaft and convert the rotation at right angles, and an eccentric roller mounted on a rotating shaft integral with the bevel gear. As the eccentric roller is fitted in a groove of the tool holder, the holder is reciprocated with a stroke corresponding to the eccentricity of the roller in eccentric rotation.

Conventionally, the eccentric roller is mounted on one end of the rotating shaft. In order to maintain the strength of the rotating shaft in some measure, the shaft must be supported by means of a plurality of bearings. If the eccentric roller is attached to the end of the rotating shaft, therefore, the shaft must be relatively long. Accordingly, the tool holder is reciprocated at a substantial distance from the axis of the driving shaft.

However, the tool holder, which projects in the form of a cantilever from the distal end portion of the grip section, is subjected to a force reactive to a force to press a grinding/cutting tool against a workpiece, and is bent corresponding to its length of projection. Also, such an undesired force acts not a little on the rotating shaft, which is fitted in the tool holder by means of the eccentric roller. If the tool holder is situated relatively distant from the axis of the driving shaft, therefore, vibration and power loss increase correspondingly, and there is a substantial difference in surface level between the grip section, containing a drive source, and the tool holder with the grinding/cutting tool therein. Thus, grinding/cutting operation is complicated and hard.

SUMMARY OF THE INVENTION

The object of the present invention is to improve a mechanism for converting rotation of a driving shaft into reciprocation and a mechanism for supporting a reciprocating tool holder, thereby reducing vibration and power loss, in an apparatus of a reciprocation type, in which a grinding/cutting tool, such as a saw blade, must be supported in the form of a cantilever.

The above object of the present invention is achieved by a reciprocating tool constructed as follows. The reciprocating tool comprises a drive source and a tool holder for holding a grinding/cutting tool capable of reciprocation, the reciprocation drive source including a driving shaft, a driving bevel gear mounted on the driving shaft, a first shaft extending at right angles to the moving direction of the grinding/cutting tool, a driven bevel gear supported by the first shaft and in mesh with the driving bevel gear, a second shaft coaxially facing the first shaft, a third shaft connecting the first and second shafts in a position eccentric thereto, a bearing mounted on the third shaft, and a reciprocating member coupled to the tool holder, the reciprocating member having a slot extending at right angles to the moving direction of the grinding/cutting tool so as to engage the bearing.

In the reciprocating tool according to the present invention, the first and second shafts, which are coaxially supported in the form of a cantilever, are connected by means of the eccentric third shaft for the bearing, and the reciprocating member of the tool holder is caused to engage the bearing situated halfway between the first and second shafts, so that the rotation of the driving shaft is converted into reciprocation. In this arrangement, the position for the reciprocation of the tool holder is situated close to the driving shaft, so that vibration and power loss produced during the conversion can be reduced.

Since the tool holder is located near the driving shaft, moreover, there is no substantial difference in surface level between a grip section of a casing and the grinding/cutting tool, so that the working operation is easy.

The reciprocating member integral with the tool holder is engagedly supported from both sides by guide members, so as to extend parallel to the moving direction thereof. Thus, the reciprocating member can be stably supported at those portions of the slot just close to the regions subjected to eccentric rotatory force from the bearing, so that the vibration and power loss can be further reduced.

DETAILED DESCRIPTION OF THE PREFERRED EMBODIMENTS

Numeral 1 denotes a grip section which contains a drive source (not shown), such as an electric motor, air motor, etc. Section 1 is provided with drive housing 3 which contains a conversion mechanism for converting rotation produced by the drive source into reciprocation of tool holder 2.

Figure 1:
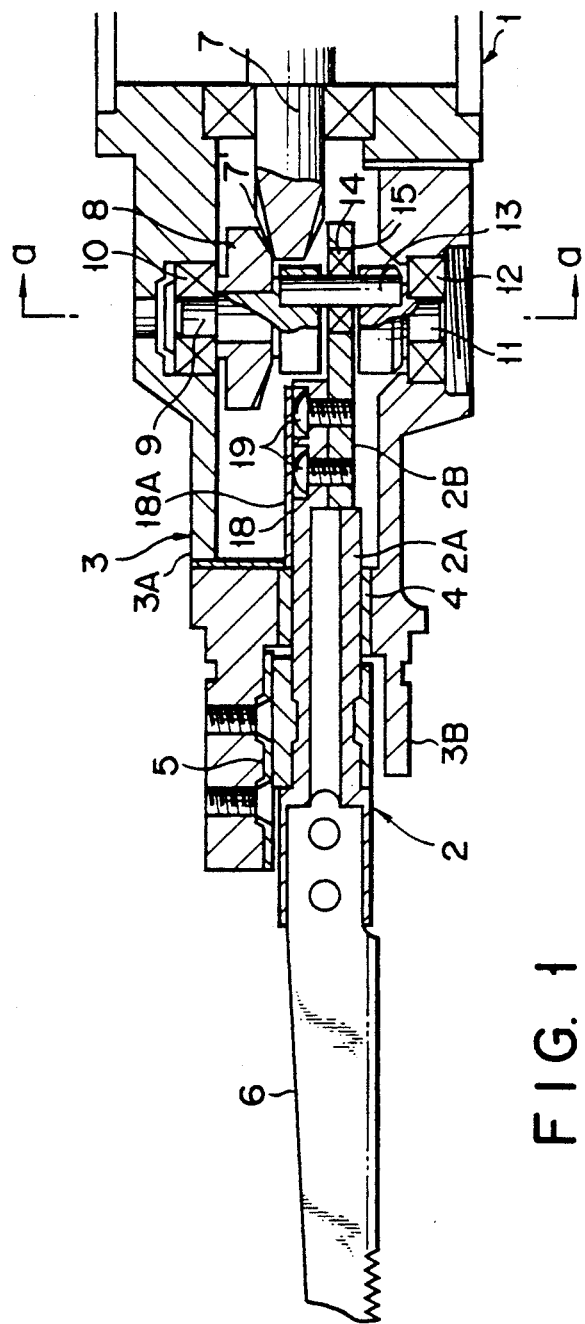
FIG. 1 is a longitudinal sectional view of a reciprocating tool according to one embodiment of the present invention.

Tool holder 2 is slidably inserted into drive housing 3 through bush 4. Guide 5 is screwed to the distal end portion of housing 3. Guide 5 slidably supports holder 2 in vertical and transverse directions, in order to prevent unbalanced load on holder 2 from acting directly on bush 4. Grinding/cutting tool 6, such as a saw blade, file, or grinding tip, is removably attached to the distal end portion of tool holder 2. In the typical example shown in FIG. 1, tool 6 is a saw blade.

Driving shaft 7 of the drive source contained in grip section 1 projects into drive housing 3. Shaft 7 is formed with driving spiral bevel gear 7'. First shaft 9, which is coupled to spiral bevel gear 8 in mesh with gear 7', is supported in the form of a cantilever on housing 3 at right angles to driving shaft 7, by means of ball bearing 10. Second shaft 11, which coaxially faces first shaft 9 at a predetermined distance therefrom, is supported in the form of a cantilever on housing 3 by means of ball bearing 12. The respective opposite faces of shafts 9 and 11, which have a relatively large diameter, are coupled to each other by means of third shaft 13, which is eccentric to the axes of shafts 9 and 11. For example, shaft 13 is loosely fitted in first shaft 9, and is fixed to second shaft 11 by press fit. Bearing 14 is mounted on the middle portion of support shaft 13.

Figure 2:
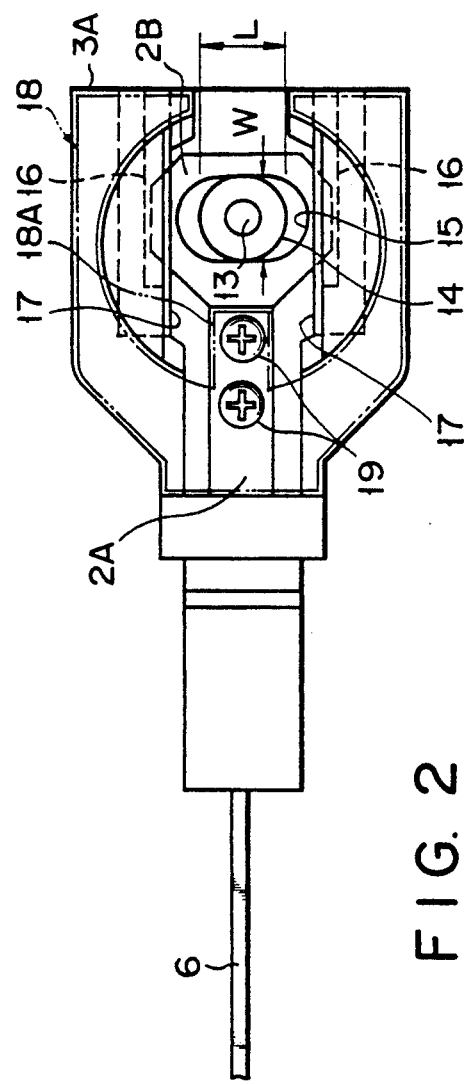
FIG. 2 is a plan view showing the reciprocating tool with the top portion of a drive housing thereof removed.
Figure 3:
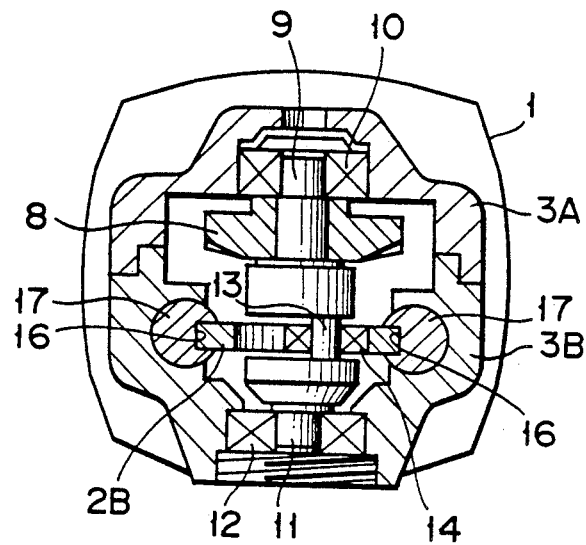
FIG. 3 is a cross-sectional view taken along line a—a of FIG. 1.
Figure 4:
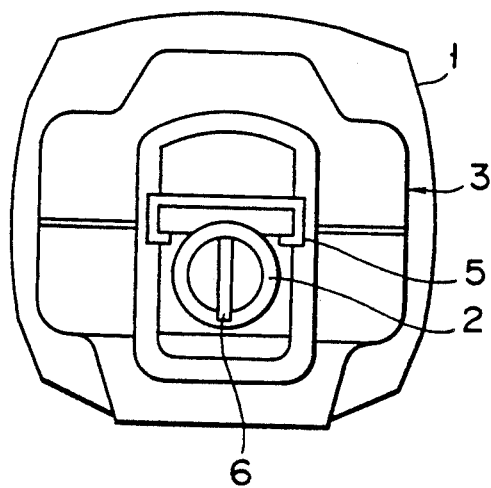
FIG. 4 is a front view of the reciprocating tool of FIG. 1.

As is shown in FIG. 2, slot 15 is bored through guide plate 2B which is screwed to guide shaft 2A of tool holder 2. The slot, which extends at right angles to the moving direction of holder 2, allows bearing 14 to be fitted therein for eccentric rotation. Width W of slot 15 is a little longer than the diameter of bearing 14, while its length L is set to a value a little greater than twice the eccentricity of third shaft 13 with respect to first and second shafts 9 and 11. Therefore, when the rotation of driving shaft 7 is transmitted through spiral bevel gear 8 to shafts 9 and 11 so that bearing 14 rotates eccentrically, tool holder 2, following the motion of bearing 14, reciprocates with a stroke twice as long as the eccentricity of bearing 14.

Two opposite end edge portions of guide plate 2B, which define slot 15, extend parallel to the moving direction of plate 2B. Outside these end edge portions, a pair of columnar slide guides 17 are fitted in drive housing 3. They each have axial groove 16 which slidably supports each corresponding end edge portion of plate 2B. Guides 17 directly support guide plate 2B from both sides thereof lest plate 2B be bent or support shaft 13 be subjected to undue force when the projected portion of tool holder 2, supported in housing 3 by means of bush 4, is subjected to reaction force from a workpiece or bent thereby.

It is difficult to obtain or maintain perfect levelness or horizontal position of guide plate 2B, since plate 2B is rendered slightly wavy, due to its working errors or errors in assembly work, such as screwing of guide shaft 2A thereto. Since slide guides 17, which slidably support the opposite end edge portions of guide plate 2B, are columnar in shape, they can slightly rock within the range of the gaps between grooves 16 and plate 2B, in accordance with the levelness or waviness of plate 2B. Thus, tool holder 2 can be easily assembled, and the slide of guide plate 2B after the assembling can be smoothed without requiring extremely high working accuracy for plate 2B.

Drive housing 3 is composed of upper and lower housing halves 3A and 3B, between which spacer 18 is sandwiched. Spacer 18, which doubles as a packing, includes piece 18A covering screws 19 which connects guide shaft 2A and guide plate 2B. If screws 19 are loosened, piece 18A prevents them from slipping off, so that spiral bevel gears 7' and 8 cannot be damaged by freed screws.

The operation of the aforementioned embodiment will now be described.

When the rotation of driving shaft 7 is transmitted through spiral bevel gear 8 to shafts 9 and 11 so that bearing 14 rotates eccentrically, tool holder 2, following the motion of bearing 14, reciprocates with a stroke twice as long as the eccentricity of bearing 14. At this time, bearing 14 is supported with a certain strength by means of eccentric third shaft 13 connecting first and second shafts 9 and 11, which are coaxially supported in the form of a cantilever on drive housing 3. Tool holder 2, which is connected to guide plate 2B surrounding bearing 14 halfway between shafts 9 and 11, is situated close to driving shaft 7 which gives rotatory force to spiral bevel gear 8 of first shaft 9. Thus, in converting the rotation of shaft 7 into reciprocation for cutting work by means of a saw blade or the like, vibration and power loss can be reduced. Moreover, grip section 1, containing the drive source, and tool holder 2 are arranged substantially in line with each other, without any substantial difference in surface level, so that the operation is easy.

When tool holder 2 is driven for reciprocation, slide guides 17 on either side slidably support the outside edge portions of slots 15 with bearing 14 therein. Also, guides 17 stably support guide plate 2B by guiding those portions of slot 15 just close to the regions subjected to eccentric rotatory force from bearing 14, thereby preventing vibration.

Furthermore, columnar slide guides 17, which bilaterally guide tool holder 2 in the vicinity of first and second shafts 9 and 11, rock automatically to take an optimum position, in order to suppress dimensional errors between grooves 16 and guide plate 2B or variation in sliding resistance or unbalance attributable to the variation of the gaps between grooves 16 and plate 2B. Thus, the vibration and power loss can be reduced also by means of the supporting mechanism for tool holder 2.

What is claimed is:

1. A reciprocating tool, comprising:
   (a) a drive source; and
   (b) a tool holder for holding a grinding/cutting tool capable of reciprocation; wherein
   (c) said reciprocation drive source includes:
      a driving shaft;
      a driving bevel gear mounted on the driving shaft;
      a first shaft extending at right angles to the direction of reciprocal movement of the grinding/cutting tool;
      a second shaft opposingly facing the first shaft;
      said first and second shafts being coaxially mounted relative to one another for rotational motion about a primary axis;
      a third shaft connecting the first and second shafts and establishing an eccentric axis that is eccentrically disposed relative to said primary axis of said first and second shafts;
      a bearing mounted on said third shaft;
      a reciprocating member coupled to the tool holder, said reciprocating member having a slot extending at right angles to the reciprocal movement direction of the grinding/cutting tool so as to engage the bearing; and
      a pair of cylindrical guide members provided adjacent to the reciprocating member, said guide members being movably mounted and defining guide grooves, wherein a rear end portion of said reciprocating member includes a pair of side edge portions that extend essentially parallel to the reciprocal movement direction of said reciprocating member, and wherein each of said side edge portions is engaged within, and held by, a respective one of said defined grooves of said guide members.

2. The reciprocating tool according to claim 1, wherein each said guide member is columnar in shape.

3. The reciprocating tool according to claim 1, wherein said grinding/cutting tool is in the form of a saw blade.

4. A tool having a housing, a reciprocally moveable tool holder for holding a tool element at a distal end of said housing, a drive source mounted at a proximal end of said housing and having a rotatable drive shaft, and coupling means for coupling said rotatable drive shaft to said tool holder and for translating rotational motion of said drive shaft into reciprocal motion of said tool holder, whereby said tool element held thereby is reciprocated, wherein said coupling means comprises:

a reciprocating member having distal and proximal ends, and a pair of lateral edges extending between said distal and proximal ends, said distal end being coupled to said tool holder, said reciprocating member further having a slot defined in said proximal end thereof which is transverse to said reciprocal motion of said tool holder;

mounting means for mounting said reciprocating member to said housing to allow for movement thereof in reciprocal directions along a reciprocal path;

first and second shafts supported within said housing on opposing sides of said defined slot for rotational motion about a common axis which is at a right angle to said reciprocal path of movement of said reciprocating member;

a third shaft extending through said defined transverse slot of said reciprocating member which couples said opposing first and second shafts one to another, and which establishes an eccentric axis that is eccentrically offset relative to said common axis of rotation of said first and second shafts;

gear means operatively coupling said drive shaft and said first shaft for transferring rotation of said drive shaft to said first shaft, which transferred rotation causes said third shaft to rotate eccentrically about said common axis;

a bearing mounted on said third shaft and slidably received within said defined slot of said reciprocating member to allow said third shaft to allow for said eccentric rotation of said third shaft in response to rotation of said first shaft, which eccentric rotation, in turn, reciprocally moves said reciprocating member along said reciprocal path; and wherein said mounting means includes;
 (i) a pair of cylindrical guide members movably mounted to said housing adjacent a respective one of said lateral edges of said reciprocating member;
 (ii) each of cylindrical guide members defining a groove which extends parallel to said reciprocal path of movement of said reciprocating member; and wherein
 (iii) each said lateral edge of said reciprocating member is accepted within, and supported by, a respective one of said grooves defined in said cylindrical guide member adjacent thereto.

5. A tool as in claim 4, wherein said gear means includes a driving bevel gear associated with said drive shaft, and a driven bevel gear associated with said first shaft and intermeshed with said driving bevel gear.

* * * * *